United States Patent
Usey

(10) Patent No.: US 9,030,412 B1
(45) Date of Patent: *May 12, 2015

(54) METHOD AND APPARATUS OF POSITION TRACKING AND DETECTION OF USER INPUT INFORMATION

(71) Applicant: Open Invention Network LLC, Durham, NC (US)

(72) Inventor: Matthew Kevin Usey, Allen, TX (US)

(73) Assignee: Open Invention Network, LLC, Durham, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 14/341,987

(22) Filed: Jul. 28, 2014

Related U.S. Application Data

(63) Continuation of application No. 12/693,811, filed on Jan. 26, 2010, now Pat. No. 8,791,899.

(51) Int. Cl.
| | |
|---|---|
| G09G 5/00 | (2006.01) |
| G06F 3/038 | (2013.01) |
| G06F 3/0354 | (2013.01) |
| G06F 3/043 | (2006.01) |
| G06F 3/041 | (2006.01) |

(52) U.S. Cl.
CPC ............ *G06F 3/038* (2013.01); *G06F 3/03545* (2013.01); *G06F 3/0436* (2013.01); *G06F 3/0418* (2013.01)

(58) Field of Classification Search
CPC ..... G06F 1/1632; G06F 3/041; G06F 3/0488; G06F 3/0346
USPC ......... 345/156–158, 160, 161, 167, 173, 178, 345/174, 179
See application file for complete search history.

(56) References Cited

U.S. PATENT DOCUMENTS

| | | | | |
|---|---|---|---|---|
| 6,100,877 A | * | 8/2000 | Chery et al. ................ | 345/178 |
| 2009/0315838 A1 | * | 12/2009 | Geiger ........................ | 345/173 |

* cited by examiner

*Primary Examiner* — William Boddie
*Assistant Examiner* — Saifeldin Elnafia
(74) *Attorney, Agent, or Firm* — Haynes and Boone, LLP

(57) ABSTRACT

A method and apparatus of detecting user initiated movement by an input element handled by a user is disclosed. The method may include performing a calibration procedure that is initiated by the user via a physical movement performed by the user. The method may also include positioning at least one sensor to dynamically adjust a size of an effective workspace range capable of detecting the user's movement of the input element.

20 Claims, 18 Drawing Sheets

CALIBRATION ARM AND BUTTON

FIG. 13         CALIBRATION ARM
                    AND BUTTON

METHOD AND APPARATUS OF POSITION TRACKING AND DETECTION OF USER INPUT INFORMATION

CROSS-REFERENCE TO RELATED APPLICATIONS

This application is a continuation of application Ser. No. 12/693,811, entitled "METHOD AND APPARATUS OF POSITION TRACKING AND DETECTION OF USER INPUT INFORMATION", filed on Jan. 26, 2010, now issued U.S. Pat. No. 8,791,899, issued on Jul. 29, 2014, the entire contents of are hereby incorporated by reference.

TECHNICAL FIELD OF THE INVENTION

This invention relates to a method and apparatus of tracking and detecting user initiated input information via dynamic sensors positioned to receive the user input from user initiated motion.

BACKGROUND OF THE INVENTION

Before typewriters and computers, individuals typically wrote using handheld writing implements, such as pens or pencils. In addition, even given the benefits of a keyboard and computer mouse, there are situations in which a user of an electronic device, such as, a personal computer, could benefit from using a pen-shaped writing implement to create information. In one example, a computer graphic artist may desire to draw something directly on the display screen of a computer. Certainly, the artist may rely on the mouse as an input device to the computer, however, while the mouse may provide the customized input, the mouse may not provide a sensitive and/or comfortable enough option for the artist who is accustomed to using a handheld pen to draw a picture.

One conventional product used to draw with a computer is the Wacom® pen tablet device. Specifically, the Wacom® Intuos® line of pen tablet devices provides a device that may accept pen movement by hand and relay that input to the computer display. These tablet products consist of a tablet and a pen-shaped stylus (i.e., pen shaped handheld device).

FIG. 1 illustrates an example of a conventional tablet device and a stylus 10 that may be handled by a user. Another example tablet may incorporate the use of a mouse (not shown). When the user moves the stylus pen on the tablet, the onscreen pointer moves in the same manner as a mouse. In effect, the mouse and mouse pad are replaced with the pen and the tablet.

The tablet, unlike the mouse pad, is not restricted to a horizontal plane since the stylus remains in the user's hand and is therefore still operable when the stylus is shifted outside of the tablet's plane. To the contrary, the mouse rests on the mouse pad and is subject to sliding off the pad. In addition to strictly 2-dimensional inputs from the user of a mouse (i.e., up/down and left/right), tablets are pressure sensitive so that the computer is provided with an additional input describing how hard the user is pressing the stylus into the tablet.

FIG. 2 illustrates a simplified drawing of the electronic components of a pen tablet device. Referring to FIG. 2, a stylus pen 20 and a tablet 30 are illustrated as having an amplifier component 41 and an A/C power source 42 as some basic components of the tablet's circuitry.

Due to the tablet's widespread success and acceptance, many popular software applications have been created with a user interface designed to accommodate a pen tablet as an input device. These software applications receive and process the same position inputs that would otherwise be generated from a computer mouse. For those signals associated with a pen tablet input, additional pressure sensors may also be used adding an additional input feature. For example, a graphics program such as Adobe Photoshop® could be used to create a thicker line onscreen when the user increases the downward pressure on the stylus. In addition, the tilt of the stylus may also be detected and used as an additional mode of input. The stylus can even be turned around so that the "eraser" end is used as yet another input type or input eraser.

While the pen tablet devices remain popular, they are not the only technology in existence that may be used to generate user handheld information. For instance, touch-screen devices are also types of hand initiated input devices. For example, Elo Touchdevices® are one brand of touch-screen monitors. Touch-screens generally are similar to pen tablets with a couple of differences. For example, with touch-screens, the stylus is always a passive device, and thus it could be a pen, a finger, or even the corner of a credit card that is used to touch the pad and generate an input. In addition, the tablet portion of touch-screen devices is built into the display itself. Therefore, a typical touch-screen device might be controlled by a user tapping and/or dragging a finger on the device's display, while a pen tablet device would combine a traditional display with a separate stylus and tablet.

FIG. 3 illustrates a touch-screen device in use. The monitor 31 provides a touch-screen that may be accessed by a user finger 50. The technology involved in detecting the position of a stylus (whether active or passive) on a screen (whether a tablet or a display) may be similar for both examples. For example, pen tablet devices in which the stylus is passive is similar to a touch-screen which is always passive. When referring to these example devices, the term "pen tablet device" will be used with the understanding that the touch-screen device may also be considered a particular type of a pen tablet device.

Generally, pen tablet devices include two components, which include the pen or stylus and the tablet. Some pen tablet devices utilize an "active" stylus, meaning that the stylus needs to be provided with a power supply in order to operate. Other types utilize a passive stylus whose position is detected by the active element in the tablet surface. These design factors influence the ultimate design of the devices since passive components can be made smaller and lighter, as well as wirelessly.

Although these above-noted technologies may be different, the technology employed for the detection process is not of great importance to the typical user. Rather, the manner in which the user interacts with the product is of greater importance to the user. In other words, most users don't have a preference whether a given device uses a touch-sensitive writing surface to detect position, or, if it instead uses passive or actively-generated magnetic fields to operate. The user is more concerned about features, such as, wired versus wireless operation, device weight, device precision and sensitivity, durability, and size.

Within the user's interaction, some features may be more important to the user. Obviously, a wireless tablet would have certain advantages over a wired tablet, however, perhaps a wireless stylus would be of less significance since the stylus is never far from the tablet.

With any pen tablet device, there is a concern that some amount of drift will occur. Generally, the accuracy of an electronic stylus data input device may only be as accurate as the amount of drift that occurs. One procedure to minimize the amount of drift that occurs is to perform a proper calibration procedure.

Certain tablet technologies rely on natural magnetic fields, which can be affected by various forms of interference, such as, metallic objects. If a pen tablet device is operating based on the predefined characteristic that the magnetic field environment is static, and the user is moving unexpectedly or a metallic object is brought near the surface of the tablet, then certain drift may be experienced compromising the user's writing experience (e.g., a truck drives towards the vicinity of the tablet device). Certainly, such a distraction will influence the magnetic field near the device and cause distortion.

These type of inertial devices measure their own movements using inertial sensors (e.g. gyroscopes and accelerometers) which provide readings as to how the devices have moved since they initially began receiving data measurements. These devices do not use a calibration procedure prior to allowing user input. As a result, small errors build up over time because the true position of the device and user's movements is not known.

For the magnetic case, the error could be from a shifting reference point due to the shifting magnetic field, while in the inertial case, the error may simply compound because the measurements are made with respect to the previously calculated position.

The user interaction is a factor to consider in the design of the pen tablet device. Nevertheless, there are numerous other features which may be exploited, such as, initial setup procedures, to expand the options, quality and overall performance available to the user.

SUMMARY OF THE INVENTION

One embodiment of the present invention may include an apparatus configured detect user initiated movement by an input element handled by a user. The apparatus may include a calibration input unit configured to perform a calibration procedure that is initiated by the user via a physical movement performed by the user. The apparatus may also include at least one sensor positioned by the user to dynamically adjust a size of an effective workspace range capable of detecting the user's movement of the input element.

Another example embodiment of the present invention may include a method of detecting user initiated movement by an input element handled by a user. The method may include performing a calibration procedure that is initiated by the user via a physical movement performed by the user. The method may also include positioning at least one sensor to dynamically adjust a size of an effective workspace range capable of detecting the user's movement of the input element.

DETAILED DESCRIPTION OF THE INVENTION

Figure 1:
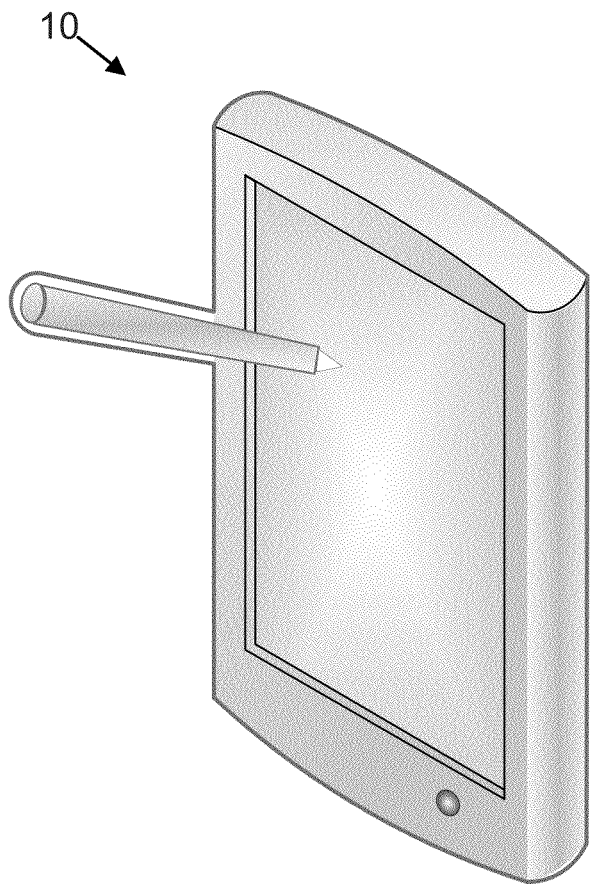
FIG. 1 illustrates an example of a conventional tablet device.
Figure 2:
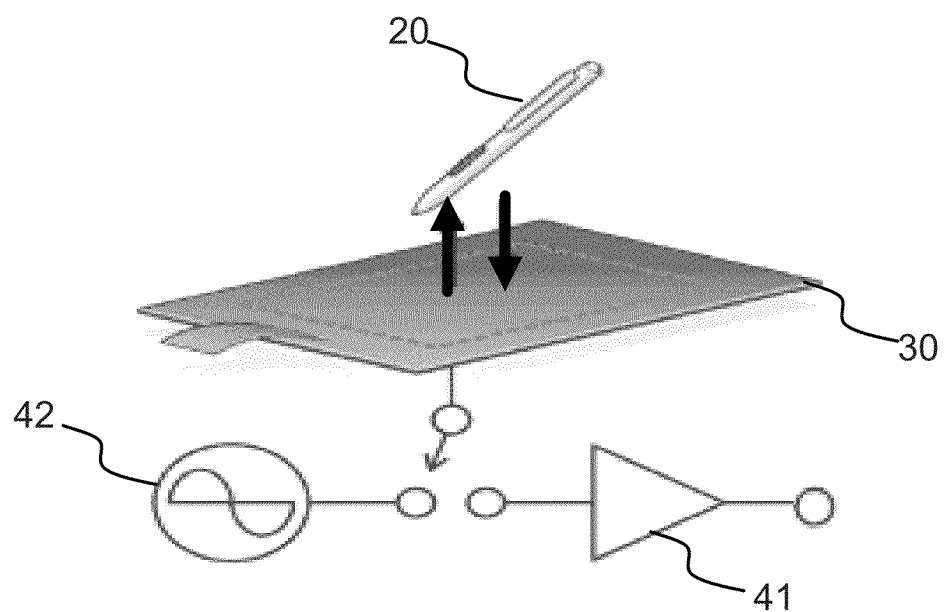
FIG. 2 illustrates an example of the components of a conventional tablet device.
Figure 3:
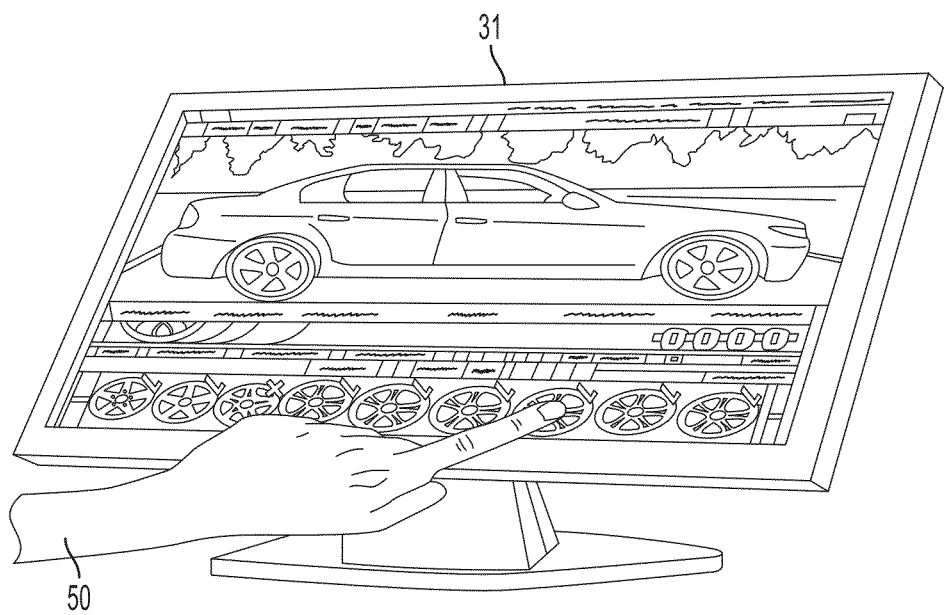
FIG. 3 illustrates an example of a conventional touchscreen device.

It will be readily understood that the components of the present invention, as generally described and illustrated in the figures herein, may be arranged and designed in a wide variety of different configurations. Thus, the following detailed description of the embodiments of a method, apparatus, and device, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Pen tablet devices may be used as input devices in association with computers and other electronic devices, such as, personal digital assistants (PDAs), mobile phones, and handheld gaming devices (i.e., Nintendo DS®). In some instances, such as, touch-screen computers, PDAs, and gaming devices, the tablet may be the only active component while the stylus is passive and could be a pen or even a finger. In other instances, the tablet may be merely used as a stable surface made of a specific substrate on which to move the active pen or stylus.

In addition, many different technologies may be used to detect the position of the stylus on the tablet. For example, the stylus's presence may be detected by measuring disturbances in magnetic fields, reflections from acoustic waves, and resistance changes caused by pressure, etc. Regardless of the mechanism used to track the stylus movement against the corresponding tablet, these types of devices will continue to evolve. However, there will always be room for increased optimization in the accuracy, usability and alternatives available in the detection technology.

Implementing a dynamic sensor placement scheme, that may be adapted to be used with the various position-detecting technologies already in existence today, may provide an optimized way to expand the writing surface available to the user. The sensors which detect the stylus may be detachable as opposed to being fixed at the tablet surface. Such a design would allow the sensors to be affixed to various different surfaces (i.e., such as white boards, walls, desk surfaces, and/or projection screens, etc.). Such a configuration would effectively allow the user to engage in information input outside of a simple pen tablet device.

It does not matter whether the styluses are active or passive. The electronics and related circuitry may also be moved out of the stylus and into a versatile grip device that may be attached to a writing implement. In this way, a single pen tablet device may be used with various different implementations (i.e., a marking pen or an unmarking generic stylus). The user merely has to move the versatile grip from one writing implement to another to allow for data input.

Other design considerations may provide a technique to minimize the writing errors due to the "drift" phenomenon that is especially prevalent with inertial position-tracking devices. The corner sensors that are affixed to the drawing surface may have a fixed calibration button that can be selected to provide the device with a known position with respect to the corner currently occupied by the sensor. Such a calibration technique may provide the device with a feature to recalibrate itself.

Another option may be to introduce an acoustic detection technology that removes restrictions on the substrate material of the conventional tablet while adding pressure measurement capabilities. For example, the device would use ultrasound emissions to detect the stylus position by using an active stylus which generates and emits ultrasound that is tracked by corner detection sensors on the tablet. Varying the shape of the acoustic pulse relays additional information such as pen orientation and tip pressure.

In another example, an alternative embodiment may include a passive stylus that is made of echo-genic (sound-echoing) material that reflects sound pulses from the corner sensors which may be operated with a sound pulse transmitter/receiver unit. Another embodiment may include incorporating the rotating ball of a ball-point stylus to activate a transducer assembly within the stylus to generate the ultrasound signals. These above-noted example embodiments, along with other examples, will be described in detail below.

Generally, the effective writing surface of a pen tablet device is limited to the size of the tablet. In contrast, a mouse can be used in an area limited only by the size of the available surface area, and further limited by the display size of the monitor. The mouse movement may further be mapped to the screen movement, e.g. a slow mouse setting would allow a large mouse movement to translate to a relatively small onscreen movement. In such a case, a mouse possesses an advantage over a pen tablet device due to its ability to be moved beyond a predefined area and its ability to have its intensity adjusted.

The reason that the movement of a stylus is limited to the tablet size is the fact that the tablet possesses a sensing mechanism that is limited to the effective area of the tablet. For the majority of tablet designs, including Wacom® tablets, the detection circuitry lies beneath the surface of the tablet itself.

In another example, a projected capacitive touch-screen has a sensor grid of micro-fine wires laminated between two layers of protective glass inside the tablet. The change in capacitance that occurs with a touch can be measured, and, in turn, the position of the stylus can be determined. Other technologies, such as surface conductance and resistance measurement technologies apply a voltage across a coating that covers the glass substrate of the tablet and then measure voltage changes that occur when the coating is touched.

Surface acoustic wave (SAW) technology devices, such as, Elo Touchscreen's Intellitouch® line, operate by measuring a change in ultrasonic waves that are generated in a glass tablet that occurs when the tablet is touched. The same company's acoustic pulse recognition (APR) technology utilizes sensors that are mounted around the outside of the tablet to listen for the acoustic signatures that come from touching or dragging the stylus or other device across the glass tablet. Further examples include infrared (IR) devices, which simply create a grid of IR beams across the tablet and look for any light beam obstruction in order to determine a position. All of these above-noted technologies utilize tablets of a fixed size.

The limited nature of the tablet size is well known to the consumers. Despite the fact that under different circumstances the user may desire to have a different tablet size, it is well understood that the size of the tablet is not adjustable. For Example, Wacom's Intuos® line, offers six different size options, from 4 inches by 6 inches up to 12 inches by 19 inches. These tablets are all fixed sizes and cannot be adjusted at all.

By removing the sensor technology from the rigid substrate of the tablet, the size of the "canvas" or "work area" of the user may be expanded, decreased or adjusted to a specific work environment. In addition, the user may be able to simply setup their own preference without having to purchase more than one sensing device. For example, the sensing assembly would include 1 or more units/sensors that would be placed at the corners of the user's desired work surface (i.e., his or her desk). The sensor placement designated by the user would determine the effective area of the tablet.

Figure 4A:
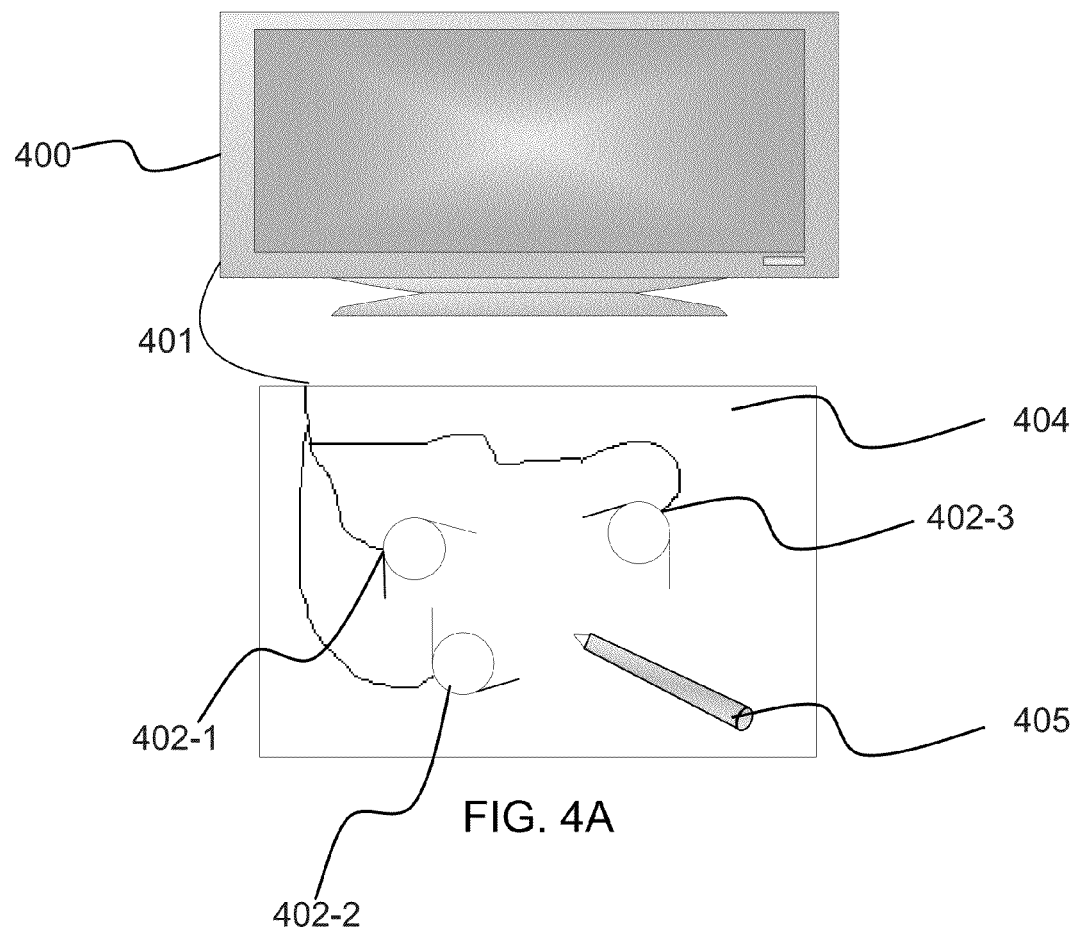
FIGS. 4A-4C illustrate example sensor placement configurations according to an example embodiment of the present invention.

FIG. 4A illustrates an example dynamic sensor placement configuration, according to an example embodiment of the present invention. Referring to FIG. 4A, a display monitor 400 is illustrated as being connected via a connector 401 to a set of sensor units 402-1 through 402-3. The sensors are placed on a flat surface 404 and a stylus 405 is used to generate writing signals.

The sensor units may be deployed onto whatever sized tablet the user desires. In operation, the user would position the sensors on a flat surface 404 and then use the stylus 405 to write on that surface. The addition of the sensor units 402 to a given surface, would, in effect, create a tablet-like portion of the pen tablet device. However, in this example the alleged creation of a pen tablet device includes dynamic and flexible dimensions.

Figure 4B:
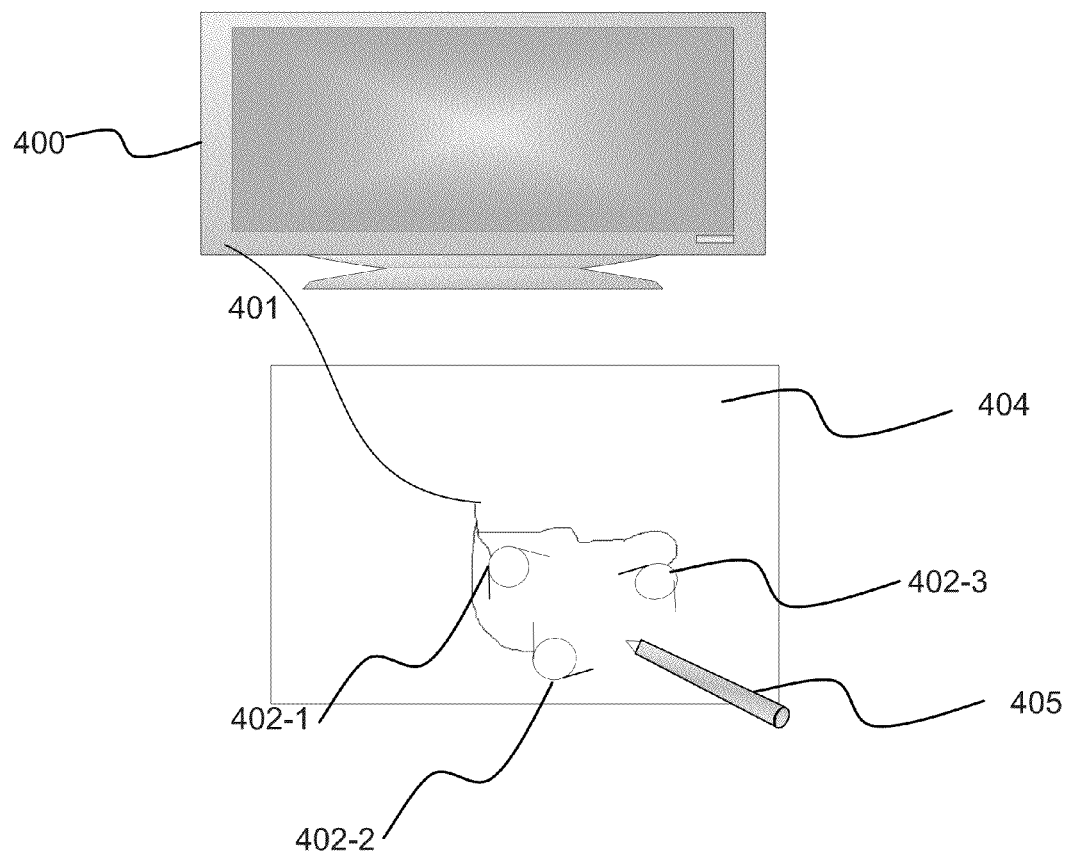

FIG. 4B illustrates an example of a smaller area that is designated to receive the writing signals from the user's stylus. The sensors 402 in this example were simply positioned in a smaller surface area and in closer proximity than in the previous example. In both instances, the sensors provide a flexible way to create a work area and pick up the movement of the stylus.

Figure 4C:
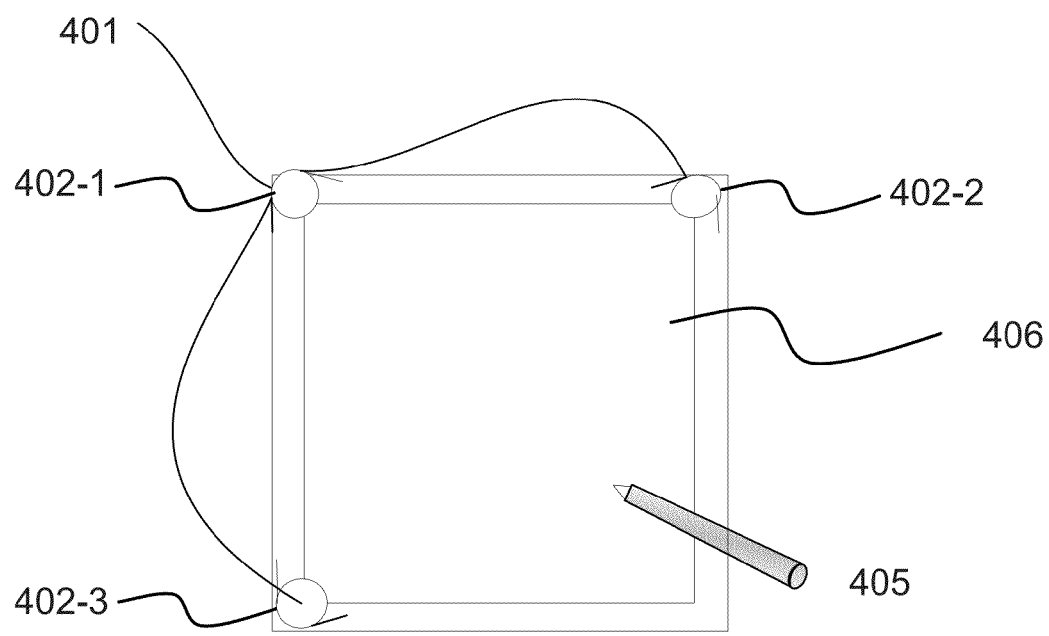

FIG. 4C illustrates another example that uses the dynamic sensors along with a clipboard or pre-sized tablet template 406 that may simply be selected as a desirable sized work space. The tablet 406 includes corners that are shaped to accept the snapping or mounting of the sensors 402 onto the tablet 406. However, in this example, the table is merely a passive surface that is used to draw by the user as opposed to a tablet that has embedded sensors included in its substrate layers.

Figure 5:
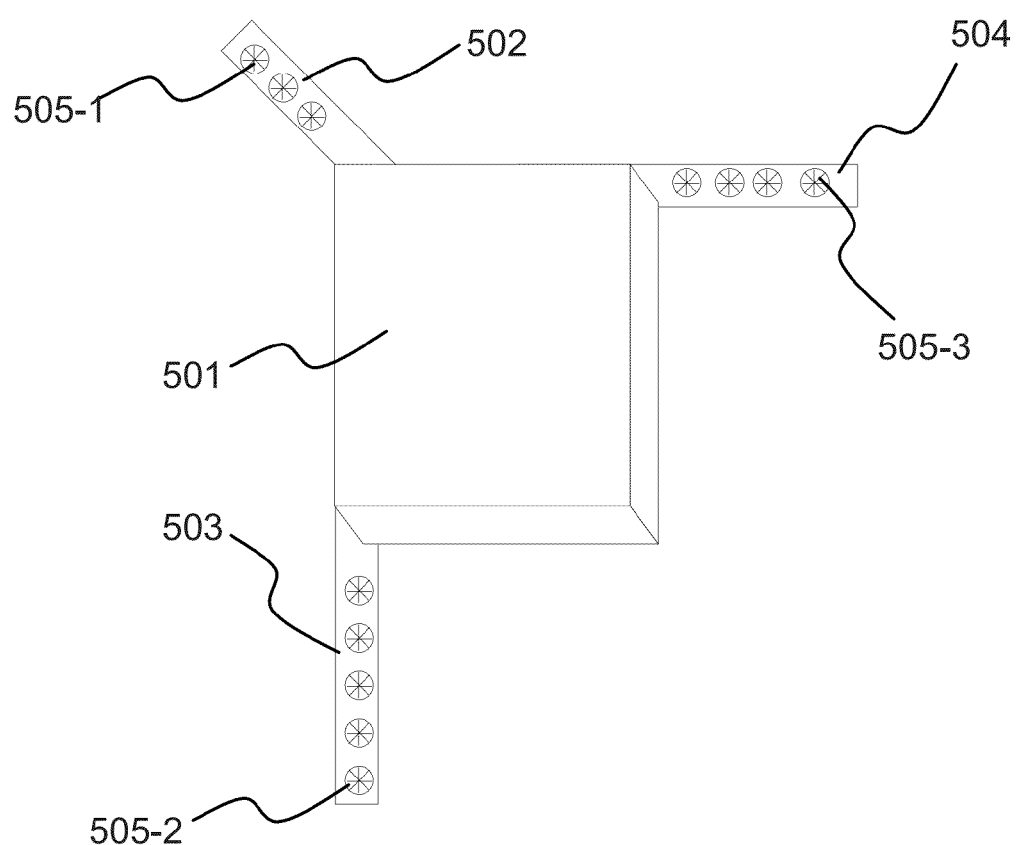
FIG. 5 illustrates an example sensor according to an example embodiment of the present invention.

FIG. 5 illustrates an example close-up illustration of one of the multiple sensors, according to an example embodiment of the present invention. Referring to FIG. 5, multiple axes are illustrated as being accessed by the sensors (i.e., X, Y and Z-axes). The corner sensor units could be designed with sensors in multiple axes as may be observed in the close-up of FIG. 5.

The physical extensions, or arms 502-504, of the sensor unit assemblies serve multiple purposes. One purpose is to provide a physical separation between sensors. This is used by sensors which use triangulation algorithms to determine position, because algorithms become more accurate as the distance increases between sensing units. Such algorithms are especially true regardless of whether the technology depends on reflected waves, transmitted waves, and/or wave disturbances. A second purpose of the sensor arms 502-504 is to provide controlled, non-coplanar sensor assemblies. The position of sensors must be precisely known when detecting position, regardless of the technology. In other words, knowing where an object is with respect to a given sensor does not provide useful data unless that sensor's position with respect to the other sensors is known. In order to determine the position of an object outside of the two dimensional tablet plane (e.g. how high a stylus is above the tablet plane), there must be a sensor that is outside the two dimensional tablet plane. The sensing arms also provide a visual indication to the user concerning the location and dimensions of the usable space.

The arms 502-504 of the corner sensor unit 501 can take more than one form. They can be rigid with a fixed size as illustrated in FIG. 5. In this example, the arms would be appropriate for those technologies that must have a single fixed relationship between sensor arms in different axes. Each of the sensor arms 502-504 includes sensor units 505-1 through 505-3, which represent one or more sensor units included on each sensor arm 502-504.

Figure 6:
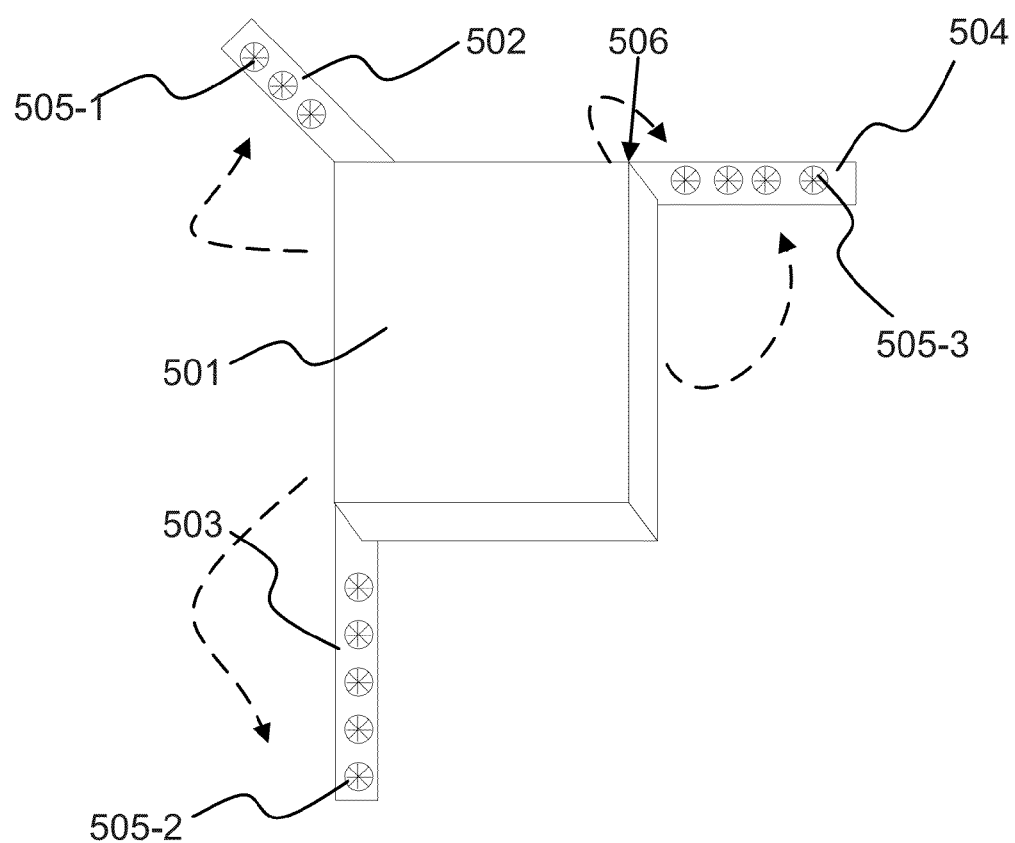
FIG. 6 illustrates another example sensor according to an example embodiment of the present invention.

For portability, these sensor arms 502-504 could be hinged so that they could fold for easy portability when not in use. FIG. 6 illustrates one example embodiment where the arms are hinged to allow for easy portability and adjustment of the arms 502-504. The identifier 506 illustrates the location of one of the example hinges (not shown). The dotted arrows illustrate the movement that may be made by the arms when they are folded in and out of the sensor body of the sensor 501.

Figure 7:
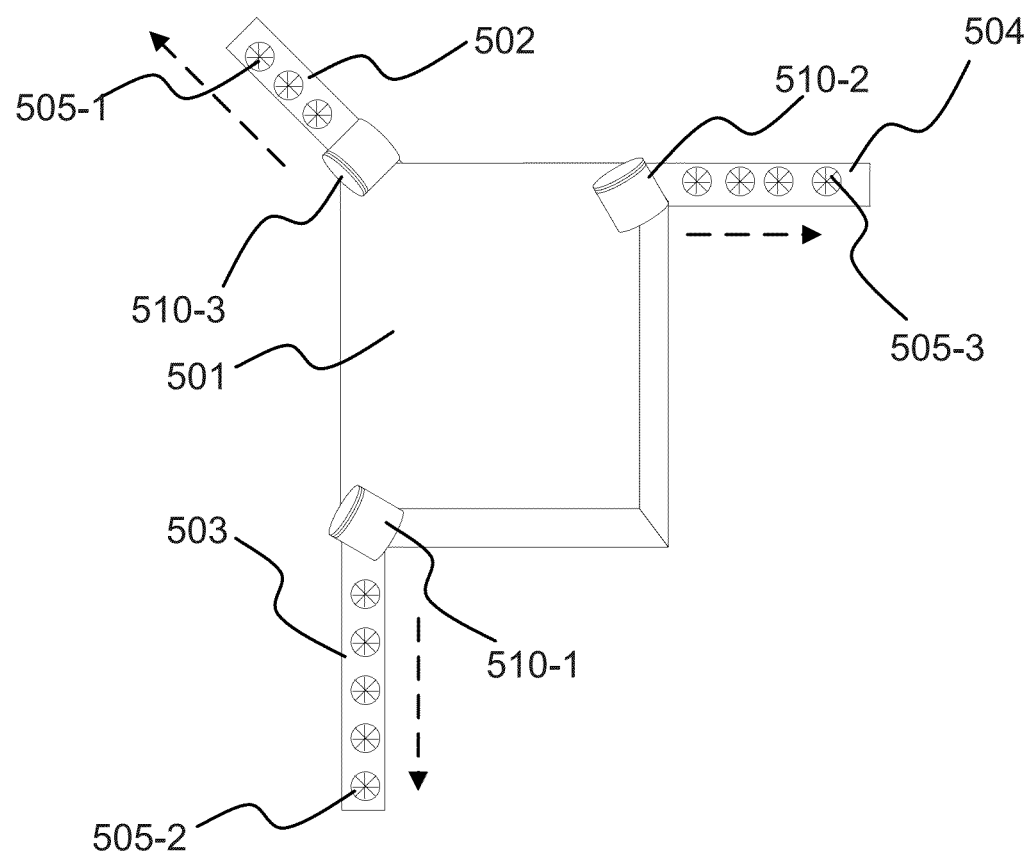
FIG. 7 illustrates yet another example sensor according to an example embodiment of the present invention.

Another form that the sensor units could take is a "reel" type arm assembly in which the sensor arms 502-504 are extended away from reels that are mounted on the sensor unit 501, as illustrated in another example embodiment of FIG. 7. In this example, reels 510-1 through 510-3 represent adjustable arms which are adjustable by simply pulling the arms into and out of the reel to expand (unroll) or decrease (roll-up) the number of sensors and the size of the effective workspace range of sensor detection.

The arms 502 through 504 may be bendable only in the dimension in which they are rolled. In that way, the sensor arms 502 through 504 would always remain perpendicular to each other, as illustrated in FIG. 7. If it is desired that the sensors 505-1 through 505-3 completely enclose the surface of a tablet, the length of the sensor arms could physically define the total effective workspace range by being extended or elongated all the way to the end of two or more of the sides of a rectangular workspace. Alternatively, the sensors arms may only be extended partially along the workspace area such that the sensors are capable of sensing movement within the effective workspace range of area without having to be fully aligned with the edges of the effective workspace area.

Figure 8:
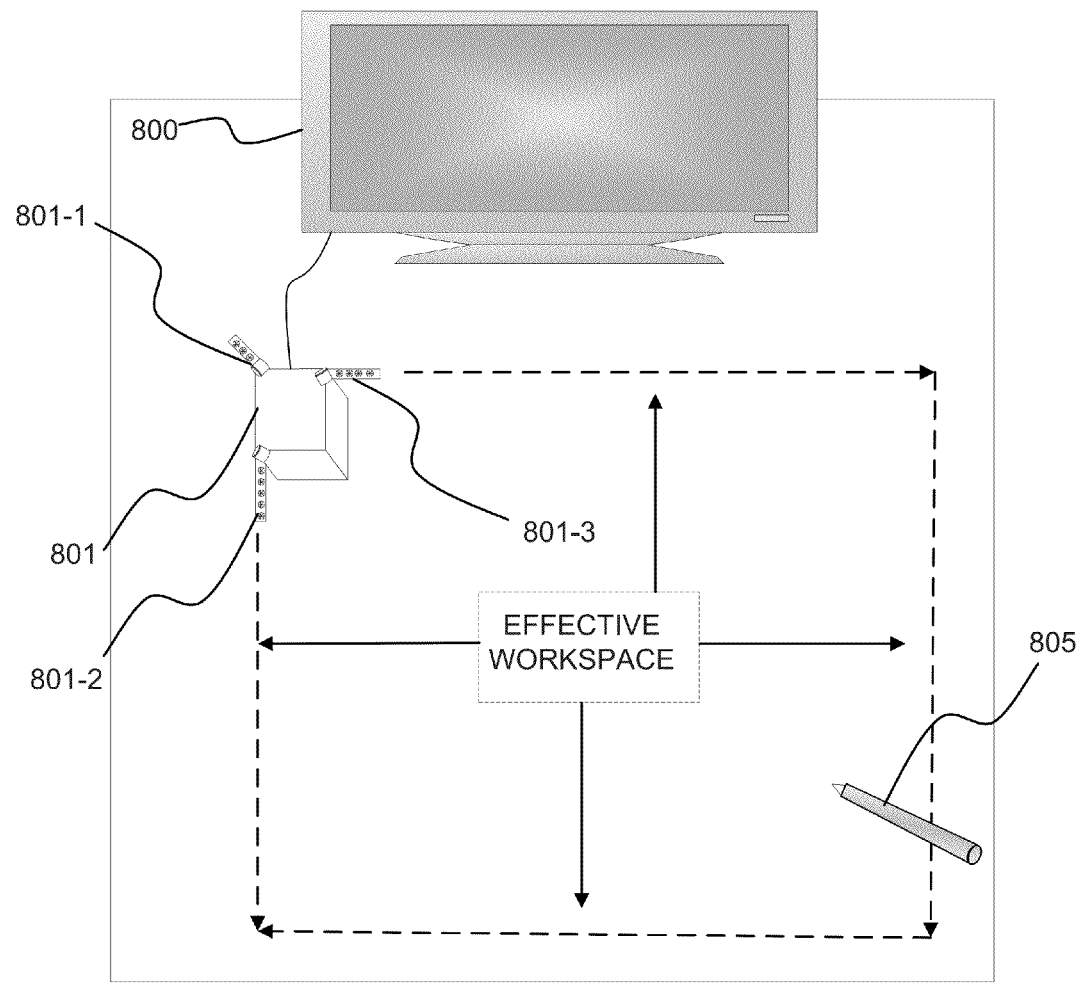
FIG. 8 illustrates an example sensor placement scheme according to an example embodiment of the present invention.

FIG. 8 illustrates an effective workspace range of area that is defined by the sensor 501 of FIGS. 5-7, according to an example embodiment of the present invention. Referring to FIG. 8, the sensor 801 is illustrated as having sensors arms 801-1 through 801-3. Sensor 801 is coupled to a display device 800 and is used to create an effective workspace that may be used with a writing element or stylus 805. Once the effective workspace has been setup by the user, the stylus 805 may be used to write in the effective workspace and the sensor 801 will detect the movement so that the information may be transferred to the display device 800.

Referring to the reel assembly sensor 501 of FIG. 7, assuming that the aspect ratio of the work area is fixed, then the multiple reels 510-1 through 510-3 that extend the arms 502-504 could be positioned in such a way that they maintain the proper aspect ratio of the arms. For example, for a 4:3 aspect ratio type display, a 4-inch extension of the left-right axis sensor arm would lead to a three inch extension of the up-down axis.

On the other hand, just because the display area is fixed to a given aspect ratio, it does not mean that the movement plane of the tablet needs to be fixed to the same ratio. For example, if the screen is a widescreen rectangle but the tablet work surface is a perfect square, a given vertical movement on the tablet would lead a smaller vertical onscreen movement that the same given horizontal movement would in the horizontal plane onscreen. The two dimensions could be mapped using a different ratio from one another (e.g. a perfectly diagonal 10 inch movement on the tablet might lead to a 3 inch horizontal and 7 inch vertical movement of the pointer on the screen). This example is analogous to anamorphic video in which a 1440×1080 recording is transposed and displayed accurately on a 1920×1080 screen due to the non-square pixels.

Similar to the one sensor example illustrated in FIG. 8, certain detection technologies might only require the top left multi-axis sensor unit. For these types of detection devices, the effective area of the tablet be defaulted to a given size, then set to a desired size through a software configuration operation. Other detection technologies might require one or more additional sensor units. For example, the placement of a bottom right sensor unit may set the aspect ratio of the tablet's usable space, and, as stated above, it does not necessarily have to correspond to the aspect ratio of the display device.

Depending on the detection technology being used, the sensor setup procedure may be customized. For detection technologies that require sophisticated circuitry within the body of the tablet itself (as opposed to sensors along the edges of a passive tablet), the use of dynamic sensors would not be compatible with the fixed sensors located in the surface of the tablet. For instance, Wacom's® electro-magnetic resonance (EMR) tablets provide a sensor board that detects the pen's movement.

Weak energy is induced in the pen's resonant circuit by a magnetic field generated by the sensor board surface. The pen's resonant circuit then makes use of this energy to return a magnetic signal to the sensor board surface. The sensor board consists of a thin sheet manufactured from glass epoxy resin or from a polyimide and PET formed film in which a large number of overlapping loop (antenna) coils are arranged in a matrix in the x and y-axis directions. Both devices are active and cannot use dynamic sensor placement techniques.

One example of a detection device that could incorporate the dynamic placement of sensors is projected capacitive detection devices. These types of devices require wires to be built into the tablet itself. In these categories, the most expensive part of the pen tablet device is the tablet sensors, not the tablet body. For these devices, manufactures could sell multiple sizes of sensor-less tablet bodies at a cost much less than the fully functional pen tablet devices. Another alternative would be to have a sensor board that adjusts to different sizes.

The sensor units could be mounted on a passive substrate, and could easily clamp onto these sensor-less tablet bodies.

Figure 9A:
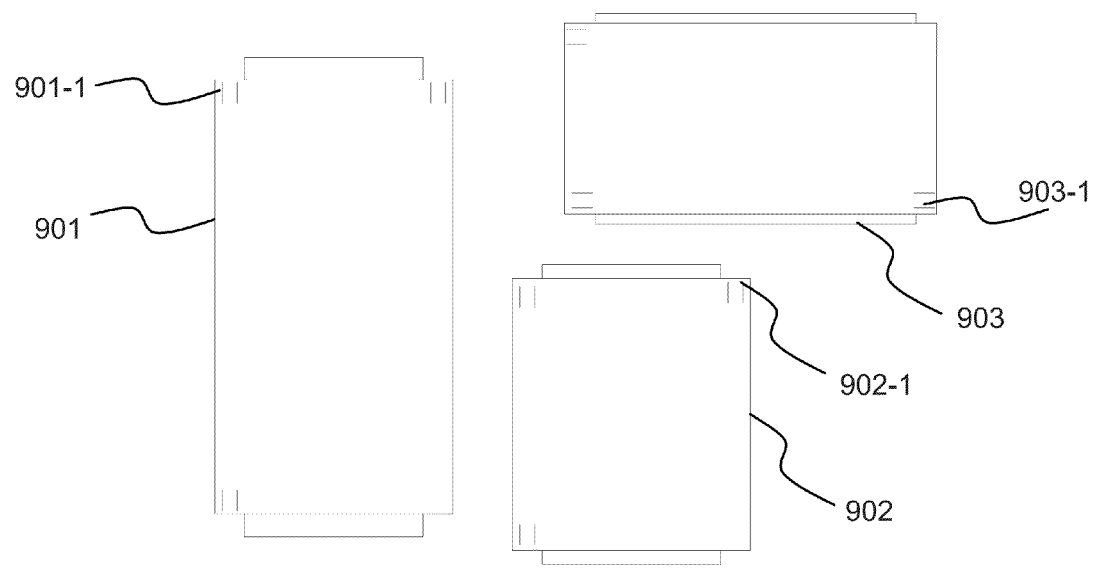
FIGS. 9A, 9B and 10 illustrate example sensors and tablet designs according to an example embodiment of the present invention.
Figure 9B:
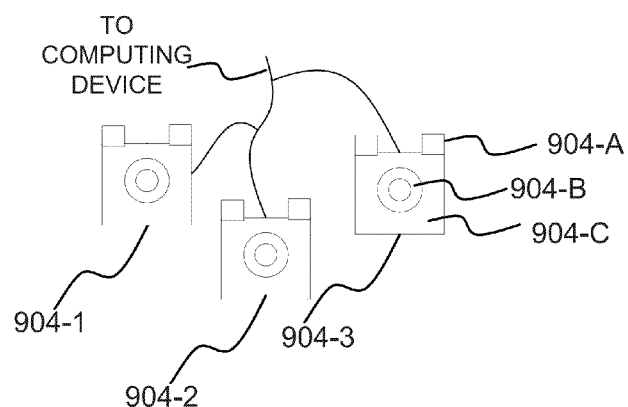

FIG. 9A illustrates an example device with three detached modular corner sensor units and various sensor-less tablet assemblies 901-903 of different sizes, according to an example embodiment of the present invention. Referring to FIG. 9, a user might have a 4×6 tablet and a 9×12 tablet and switch from using one tablet size to using another tablet size by snapping the sensor assembly off of one tablet and onto the other tablet. For these situations, the different sized tablets could have configuration labels within the sensor mounting bracket that the sensor assembly could recognize. With this information, the computer software driver of the pen tablet device could automatically detect and adjust its internal parameters to accommodate the new tablet size.

In operation, once a user has selected a particular tablet size 901, 902 or 903, the user may begin snapping the sensors 904-1 through 904-3 (see FIG. 9B) onto the corners of the tablet selected. The corners of the tablet may include mounting groves 901-1 through 903-1 that are designed to mate with the body of the sensors 904-1 through 904-3. Each of the sensor bodies 904 may include attachment tabs 904-A, one or more sensors 904-B and a substrate body 904-C.

Figure 10:
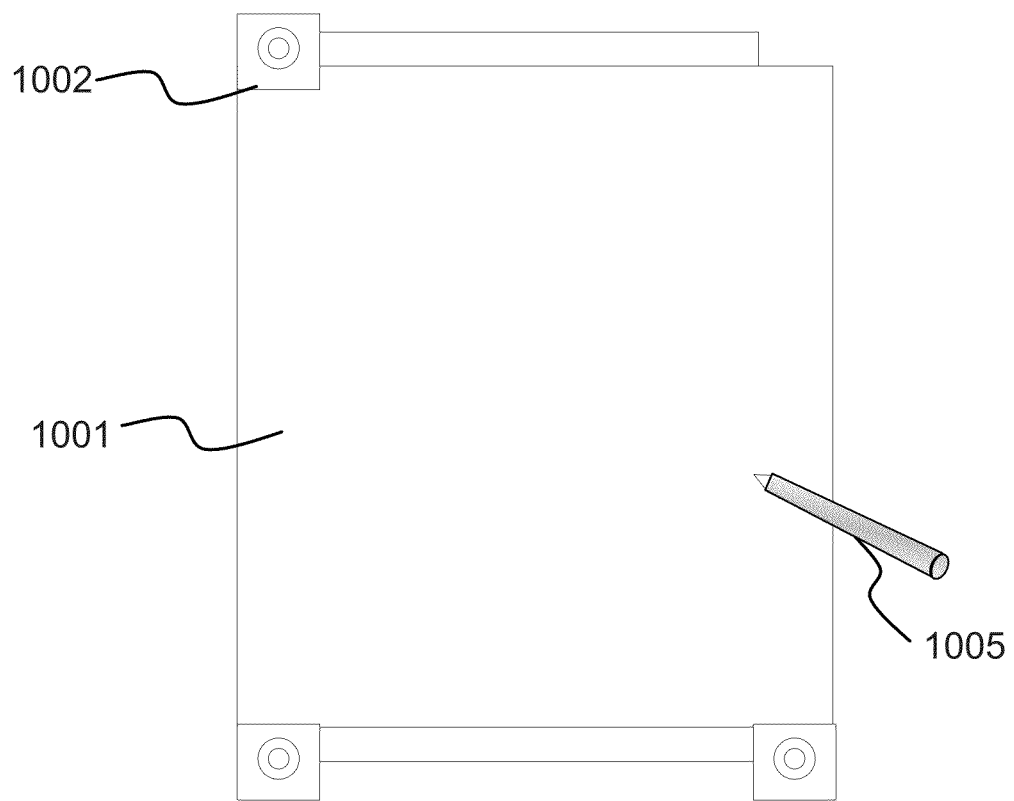

FIG. 10 illustrates the result of the sensors 1002 being affixed to the tablet 1001. Once the software application on the display device and the effective workspace has been setup, the user may begin inputting data by writing via the stylus 1005.

Another category of pen tablet devices relates to those that don't have sophisticated components built into the tablet body, but do require a certain type of material as the tablet substrate. An example product in this category is Elo Touchdevice's SurfaceWave® line of SAW-based tablets which requires a glass substrate to carry ultrasonic waves that are transmitted and received by the transducers in the sensor body along the tablet edge. Because the substrate is used as part of the detection process, some calibration may be required the first time a given tablet is used.

It is possible that a quick calibration technique could be developed in which the user selects a button on one of the sensor's heads to initiate the calibration. Following the button selection, the user may then execute a given sequence of events, such as, a drag operation from corner to corner of the effective surface desired, tapping in a particular pattern, etc. This will provide the device with the area that will be the effective surface that the device could record and use to calibrate its position-sensing algorithm.

The sensor head itself could be mounted on a thin backing surface that is printed with a template of the location of the required calibration taps, or the packaging of the sensors could include a separate sheet for directing the user's calibration taps. Other calibration procedures may be used to prepare the movement detection device for operation, which are described in more detail later in this document.

Another category of pen tablet devices includes those that don't have specific requirements regarding the substrate of the tablet. These devices simply detect the stylus using sensors positioned along the outer edge of the tablet. These devices would be able to implement the dynamic sensor placement approach of the present invention, as it provides flexibility in tablet size and functionality.

One such example is the Elo Touchdevice's® acoustic pulse recognition (APR) line of tablets, which merely requires a rigid substrate for its tablet. However, in this particular example, an extra calibration operation might be needed in order for the device to accommodate a change in different tablet-like materials. The APR technology utilizes a lookup table of recorded sounds so that it is capable of recognizing and localizing the sound of a tap or a drag motion across the tablet's surface. Obviously, a different substrate would generate different acoustic sounds. Therefore, a calibration technique like that described above for the SurfaceWave® products may be required.

In certain instances, such as, an active acoustic stylus, no calibration is needed for new substrates. This type of stylus could incorporate any tablet technology that is not dependent on the specific type of substrate of the tablet to generate and carry a wave or otherwise propagate a signal. An additional example of a technology that falls in this category is radar, which is a technology that utilizes reflected radio waves traveling in the air in order to determine the position of a remote object, in this case, the stylus tip. However, radar devices generally do not have the fine accuracy needed for pen tablet devices.

There has been a recent trend to create newer devices capable of determining the precise location of a remote passive object (i.e., stylus). Resizable tablets and related sensor technologies will have the ability to move off of the typical horizontal "table surface" tablet. Different backings will provide the sensors to be affixed in ways that expand the applications for pen tablet devices. For example, a small clamp backing would allow the sensors to be clamped onto a traditional clipboard, converting that clipboard into a full pen tablet device. In addition, a user could also use a regular ink pen as the stylus to simultaneously write on a paper clipboard and a computer device through the use of the pen tablet device.

The same small clamp backing could be used to clamp the sensors onto a drop-down projector screen. Combining this device with a projector screen would create a pseudo touch-screen device that a presenter could navigate and annotate documents and his computer through gestures on a projected image from his computer. For example, if the projector were displaying a Power Point presentation that resided on the same machine as the pen tablet device, a user could tap on the projector screen to advance the slide.

In another example, the user could draw a circle with his finger on the projector screen and the computer would recognize the hand motions via the attached sensors. The mouse cursor would then be moved in the same fashion, and, assuming that the presentation mode was setup to receive this type of signaling, the mouse would draw a circle on the presentation on the computer. This would provide a presenter with the ability to further emphasize, update and clarify his presentation by dynamically interacting with his presentation materials.

Instead of having pre-crafted slots to accept the sensors, the sensors may instead have suction cup backings that would allow the sensors to be placed on a wall-mounted whiteboard or chalk board. In this example, all work on the board would simultaneously be recorded to the computer using a simple drawing software capable of converting the movement to drawings. Such a procedure would provide a way to document notes written on a board during meetings.

Figure 11A:
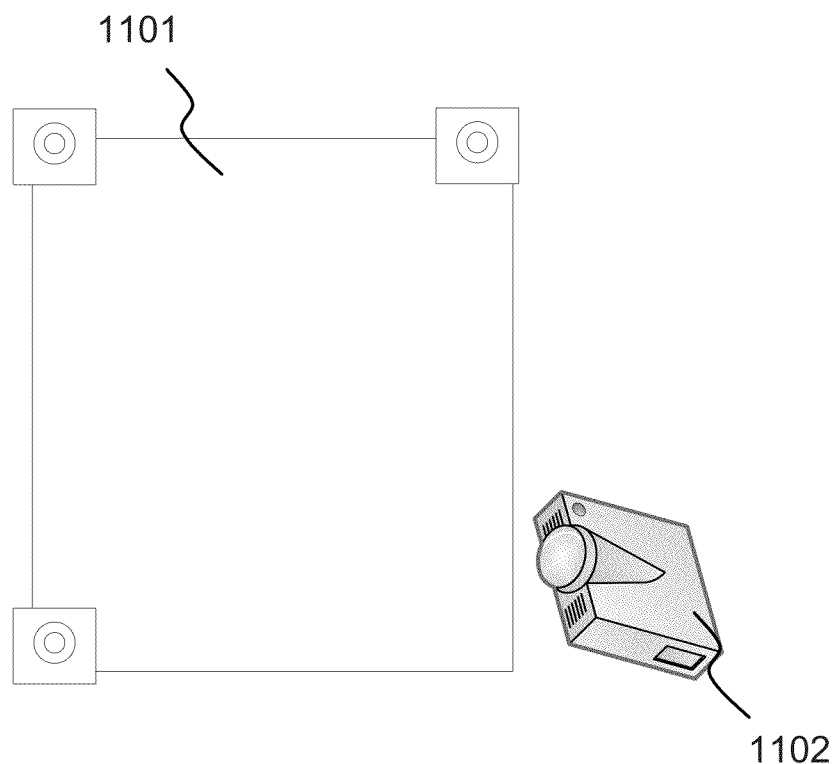
FIGS. 11A and 11B illustrate examples of alternative sensor placement options according to an example embodiment of the present invention.
Figure 11B:
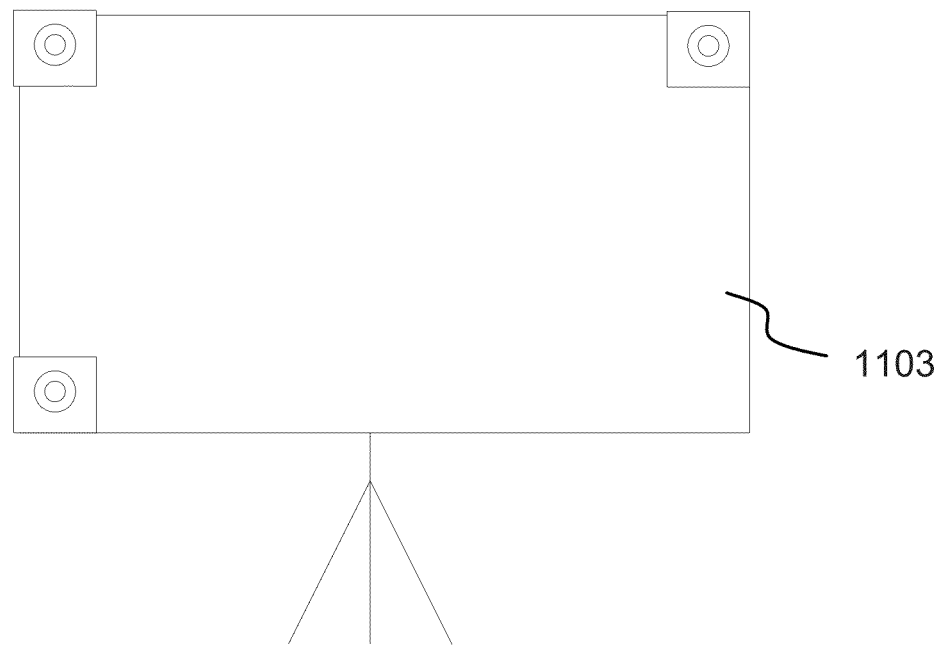

Freestanding whiteboards or upright oversized paper pads may also be used as writing surfaces that incorporate the use of the sensors. FIGS. 11A and 11B illustrate two examples of large board displays that incorporate the sensors, according to an example embodiment of the present invention. Referring to FIG. 11A, a wall mounted projector screen 1101 is used to display an image provided by a projector 1102. The sensors are illustrated as being affixed to three corners of the display screen. FIG. 11B illustrates another example of a large writing surface of a freestanding whiteboard display 1103. In both examples, the user may affix the sensors and being writing to create a data input environment while teaching and/or presenting information to a group of viewers.

The sensors may be mounted by large clamp backings that could be used to clamp onto the pages. These could also clamp onto LCD computer displays, thus converting a traditional desktop computer into a touchscreen display. The backing options are limitless and could be customized to any given flat surface.

Aside from a flat surface, the sensors could be expanded into the third dimension, allowing for full three-dimensional detection. In such an example, the sensor units could be positioned in a non-coplanar configuration to facilitate detection outside of a single plane. The ability to detect the proximity of the pen to a tablet may be useful for graphics applications in which the user does not wish to mark the onscreen page but wishes to know the stylus tip position. However, such a configuration would also create capabilities of the sensor device to provide "virtual touch" user input techniques, which do not require actual contact with the device in order to receive data input and to facilitate full three dimensional tracking.

Allowing the computer to recognize three dimensional gesturing would minimize repetitive stress injuries and increase user input efficiency. As an example, a Photoshop® application user might motion a stylus toward the display to indicate that a particular graphics layer should be moved lower into the visual "stack", thus pushing that layer back onscreen.

In order to use the motion sensor devices in three dimensions (assuming proper sensor placement), the user would merely hold the stylus in a particular position. Although in some cases the shape of the stylus could be modified based on the desired usage mode. For example, a full virtual touch might instead require that the stylus to be replaced by a hardware-enabled glove. This glove could hold the same electronics or components as the stylus, but be optimized for touchless gesture inputs.

Sensor placement increases the usability features of pen tablet devices by allowing greater flexibility in the size and type of tablet. Another way in which the usability and features of pen tablet devices may be optimized is by introducing a new stylus design for technologies which require a specific stylus. For example, technologies that either require an active stylus or passive stylus whose operational components are not in the stylus.

According to one example embodiment of the present invention, a stylus design may include enclosing the components in a universal grip that can be attached to or removed from any pen-shaped stylus. For example, the sensor detection components may be included in a simple slip or grip shaped slip that may be placed onto a pen or pencil. The shape may be similar to those grips that are sold on the market today such as BAZIC's "Shape Squishy Rubber Pencil/Pen Grip"® and Dexterity Technology Corporation's "EzGrip"®. This universal grip would allow flexibility in the choice of styluses and would provide an ergonomic benefit by improving hand comfort.

Figure 12:
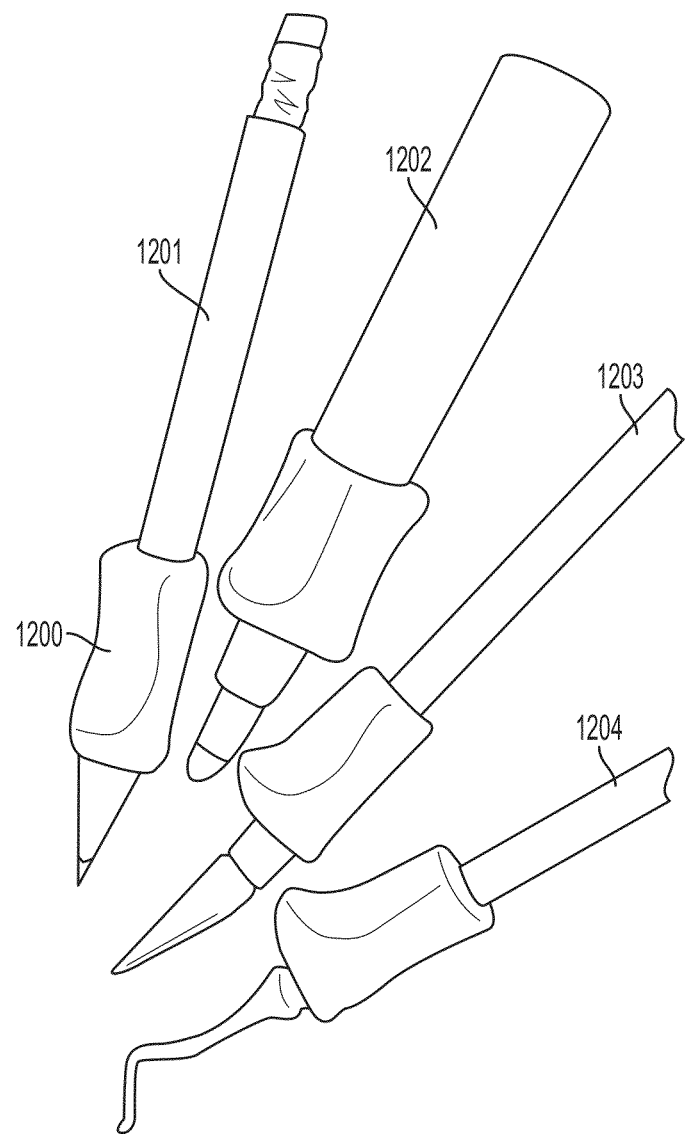
FIG. 12 illustrates an example sensor insert device according to an example embodiment of the present invention.

FIG. 12 illustrates an example of ergonomic grips that are placed on common handheld writing devices and utensils, such as, a pen, marker, surgical knife, tooth scraper, etc. (see 1201-1204 of FIG. 12), according to an example embodiment of the present invention. By including the sensors and/or electronic tracking circuits in the grip device 1200, the grip can be connected to any writing implement. For example, the grip may be attached to a red pen for marking up a paper that is on top of the tablet, or, a non-marking stylus may be used for solely manipulating an onscreen cursor. In addition to being able to choose his or her favorite writing implement to use with the pen tablet device, the user can also switch writing implements as needed without the need for purchasing a new pen tablet stylus. For instance, the user would only need to switch the grip from the old pen to the new pen.

In addition, for marking pens, the consumer can use the same ink refills that he has always used instead of being locked into the pen tablet manufacturer for ink. For those technologies with marking styluses, the change from a pen-based stylus to a grip-based stylus will be a relatively straightforward process. The designers will only need to merely enlarge the hole from a diameter that can accommodate the ink cartridge to a diameter than can accommodate a pen-shaped stylus, then move the components from the stylus into the grip.

For those technologies which include pressure-sensitive tips built into the stylus, the grip can also be used. For this type of design, the grip will need to be sufficiently long that the user's hand is not pressing directly on the stylus itself. Because all of the downward force on the pen will be transmitted through the grip, the grip will be able to register the same downward (longitudinal) force as the tip. The components in the original stylus that respond to the increase in pressure will experience the same pressure in the grip device, and can likewise respond accordingly.

In addition to the varying designs of the movement detection devices, calibration and recalibration are necessary procedures that must be performed in order to optimize the accuracy and performance of the motion detecting devices. One way to recalibrate any device that is subject to drift is to permit the device to take a measurement and then inform the device the exact output (e.g., position) that is expected.

In one example, the user should be capable of placing the stylus in a specific spot and inform the measuring device the precise position that the device is located. If the device's internal position detection procedure leads to a different point, then the positioning algorithms can be adjusted until it has identified the proper position. Although there are numerous ways to perform this task, one way to perform this recalibration is to provide a pull-out arm on the sensor body, such as, those used to hold the sensors. At the end of the arm may be a small button.

Figure 13:
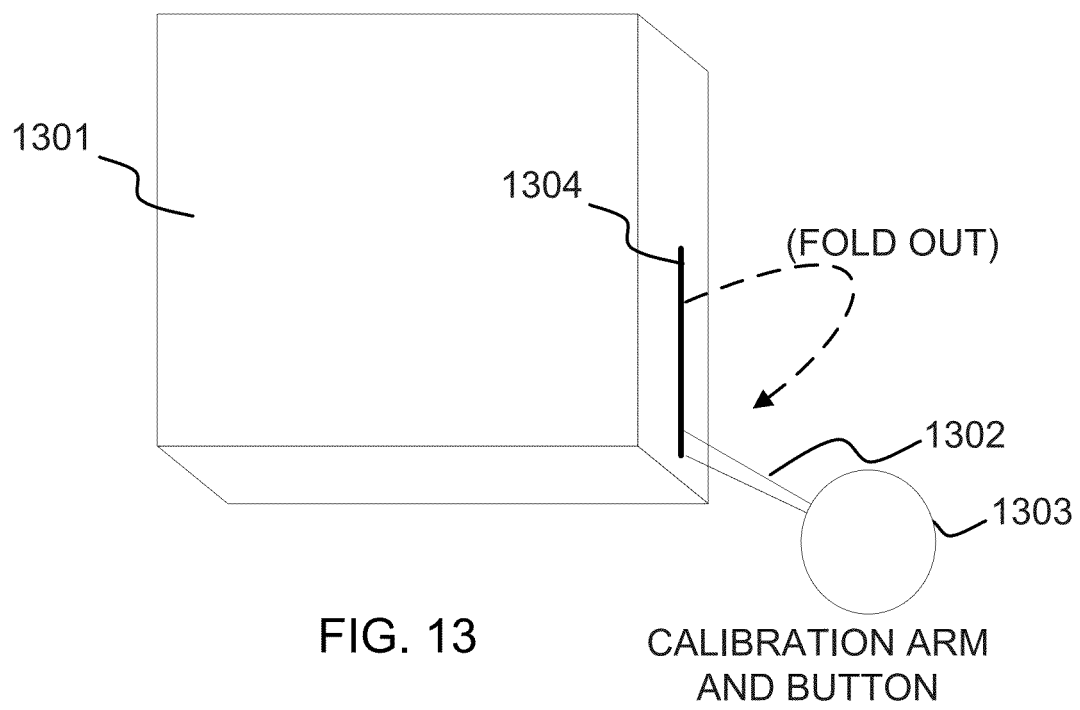
FIG. 13 illustrates another example sensor and calibration device according to an example embodiment of the present invention.

FIG. 13 illustrates an example of a sensor with a pull-out arm and a calibration button according to an example embodiment of the present invention. Referring to FIG. 13, a sensor 1301 includes a fold-out slot 1304 that an arm 1302 fold-out from that includes a button 1303. Once the arm 1302 is fully extended, the position of the button will be known by the device due to the arm's rigidity.

In operation, when the small button is pressed by the stylus, the calibration routine will launch on the target device, and the algorithms determining the measured position of the stylus will be adjusted so that the stylus point's determined position is at that button's location. In addition, for those technologies that measure force produced from the stylus (i.e., greater force invokes greater thickness), force sensors may be built into the calibration button so that the calculated force may be matched with the force directly measured from the calibration button.

Figure 14:
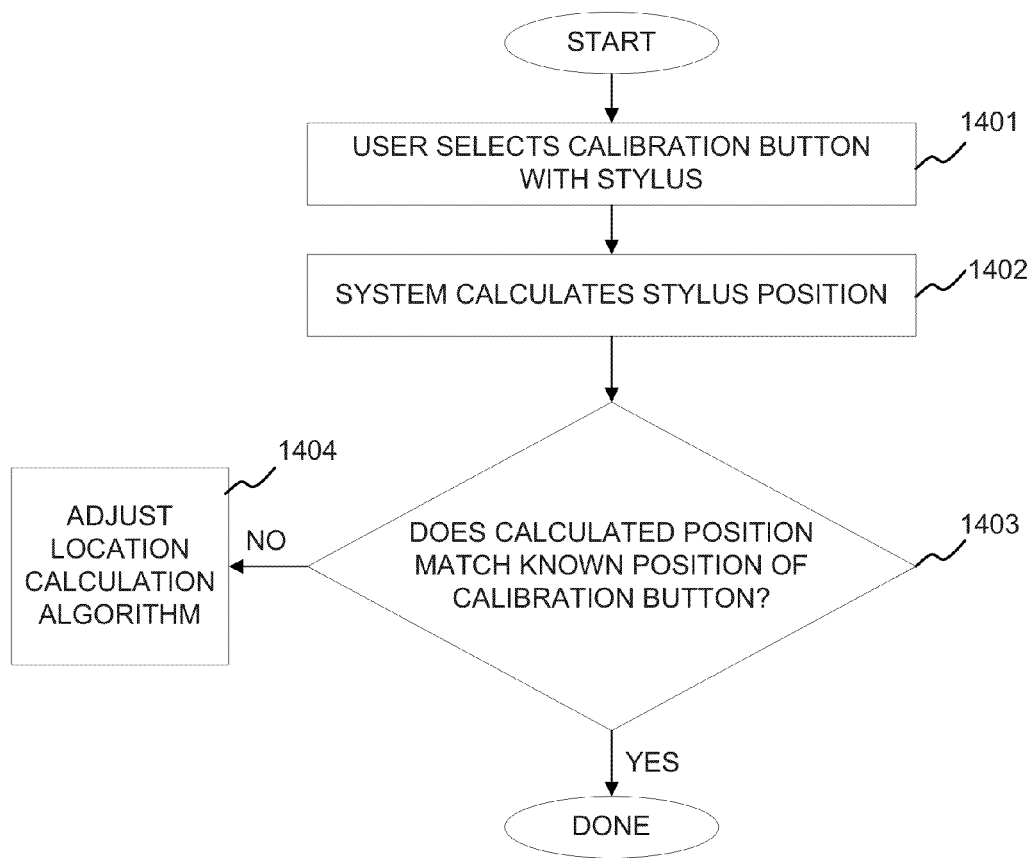
FIG. 14 illustrates an example flow diagram according to an example embodiment of the present invention.

An example calibration procedure flow diagram is illustrated in FIG. 14, according to an example embodiment of the present invention. Referring to FIG. 14, the user starts the calibration/recalibration procedure by selecting the calibration button with the stylus, at operation 1401. The system may then calculate the stylus position, at operation 1402. Next a decision may be made as to whether the calculated position matches a known position of the calibration button, at operation 1403. If not, the location calculation algorithm is adjusted, at operation 1404. Then, an additional calibration procedure may be performed. If there is a match, then the calibration is complete and the process may end.

The user may perceive that the onscreen pointer position does not accurately track with the stylus pen position, then the user may simply extend the calibration arm from the sensor unit and click the button. The calibration will be performed automatically without any further user involvement. In addition, for extremely sensitive pointer movements or in environments that are known to be particularly challenging for a given technology, the user can periodically recalibrate the device, or, the device may recalibrate itself periodically. An example of a challenging situation occurs when using a position-measuring technology that depends on natural magnetic fields while in an environment that has rapidly changing magnetic fields, such as in a moving vehicle or in an outdoor location in which large metal trucks drive close to the device.

Example embodiments of the present invention may incorporate simple acoustic technologies to detect movement. For example, an active (powered) stylus could be used to generate a noise or sound when moved across, for example, a glass window, a wooden desktop, or a white marker board. This example may be referred to as a "simplified" acoustic design because of the substrate independence and because it does not depend on more complicated acoustic technologies, such as, surface acoustic wave (SAW).

One example device that incorporates this acoustic technology may include a stylus which emits ultrasound (sound waves at a frequency above 20 kilohertz) when the stylus is activated. The activation could occur when the stylus electronics detect movement, such as, through the use of an inertial sensor like an accelerometer. Other activation options may provide a pressure switch activated by a person gripping the stylus, or, through a simple on-off switch on the device. The emitted ultrasound would be enclosed in a carrier wave, which itself could be modulated using different techniques, such as, amplitude or frequency modulation, or, even digital modulation. One example embodiment would be for the device to emit the ultrasound signals in bursts. The frequency of the bursts themselves, as opposed to the frequency of the ultrasound within the bursts, will be referred to as the "carrier frequency."

The device may also include 1 or more corner sensor units capable of detecting the acoustic signal from the stylus. These corner units can have one to three sensor sets generally, however, more than three sensor sets may also be used. In one example, the device requires three sensor sets, which could all be located at a single corner unit sensor, and, on extendable arms in physically separated corner units. Alternatively, the sensors could be located on each sensor unit.

For a 2-dimensional application (i.e. the position of a stylus tip on a 2-dimensional tablet), only two sensor sets are required. However, additional sensor sets may be used to provide additional flexibility and accuracy. For the examples discussed below it will be assumed that three sensor sets are used.

Figure 15A:
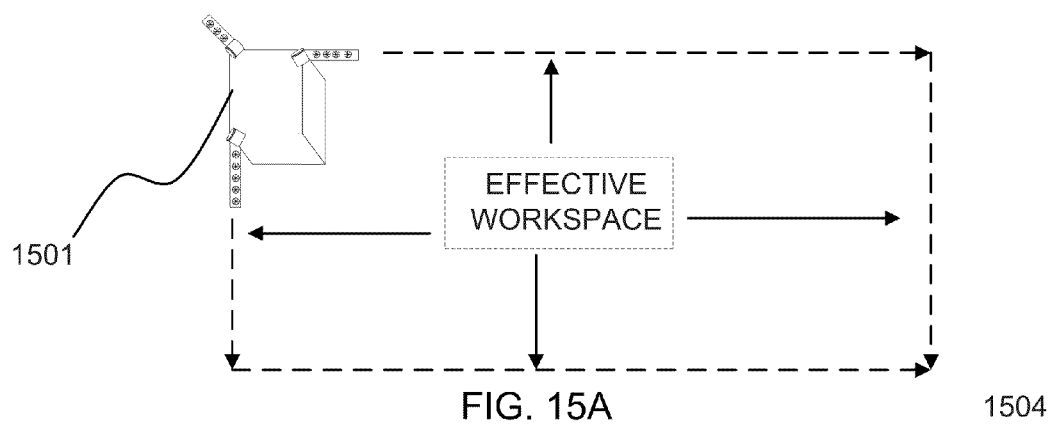
FIGS. 15A, 15B and 15C illustrates example sensor configurations according to an example embodiment of the present invention.
Figure 15B:
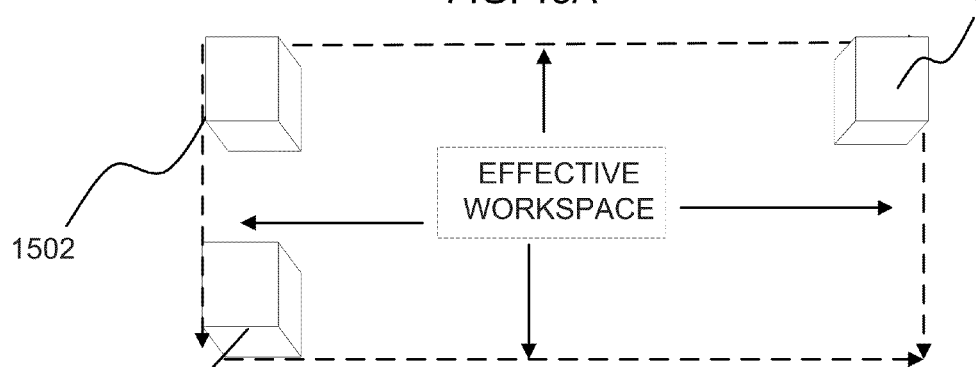
Figure 15C:
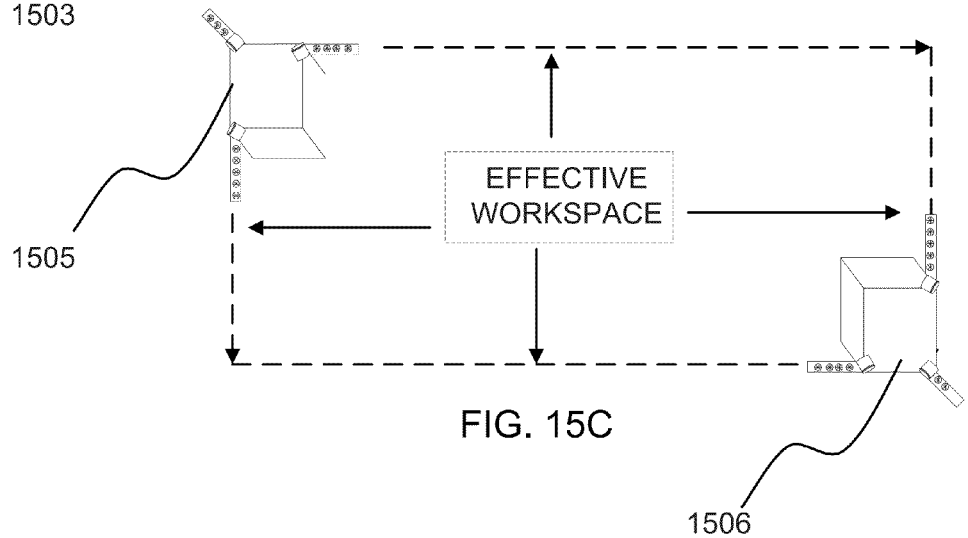

FIGS. 15A through 15C illustrate example sensor configurations, according to example embodiments of the present invention. The basic procedure in which the sensors detect position begins with emitting ultrasound at a given frequency. The emissions may be performed in bursts at a given carrier frequency upon activation of the sensor. The corner units 1501 through 1506 detect the arrival of a signal burst. By comparing the arrival time of a given burst at the various sensors, the position of the stylus may also be determined space through triangulation of the measurements.

There are several operations to this basic detection procedure. One operation is to "link" a given pulse between sensors. As an example, if sensor 1502 receives pulses A1, A2, and A3, and sensor 1503 receives B1, B2, and B3 it must also be determined which pulse from A1-A3 lines up with B1-B3. For instance, it is possible that the A1 pulse was caused by the same stylus pulse that was measured at as B2.

One procedure may include shifting the ultrasonic frequency with each pulse. For example, the pulses could start at 20 kHz and move upward at 0.1 kHz with each successive pulse until they reach 30 kHz, then, this procedure could start over. Therefore, if we use the above-noted example and add a third sensor, it may be possible to obtain a result that is illustrated in Table 1.

TABLE 1

| Pulses Sent | Sensor 1 | Sensor 2 | Sensor 3 |
|---|---|---|---|
| pulse 1 time (ms) | 1.2 | 1.4 | 1.3 |
| pulse 1 freq (kHz) | 20.3 | 20.4 | 20.4 |
| pulse 2 time | 1.3 | 1.5 | 1.4 |
| pulse 2 freq | 20.4 | 20.5 | 20.5 |
| pulse 3 time | 1.4 | 1.6 | 1.5 |
| pulse 3 freq | 20.5 | 20.6 | 20.6 |

As may be observed from Table 1, the example sensor measurements are included for three sensors based on various different pulses. One example of measuring the pulse data may include disregarding the initial time and measuring the signal frequency. As may be observed from the above, the sensor 1 pulse 2 frequency of 20.4 kHz corresponds with sensor 2 and sensor 3's pulse 1 frequency. Looking at the respective times of arrival, it may be observed that the times at the given sensors for these stylus pulses are 1.3 ms, 1.4 ms, and 1.3 ms, respectively.

Assuming that the times of arrival of a given pulse at three separate sensors are known, then it is possible to triangulate and estimate the stylus position. This is possible since the speed of sound is known to be 340.3 m/s, and, the times of arrival of a pulse at multiple sensors and the relative location of the sensors are also known. However, there is one unknown factor, which are the relative positions of the 3 sensor units. This additional factor will be addressed in the examples below.

The above example demonstrates one method to sort out the multiple pulses coming from the stylus through modification of the ultrasonic frequency. Another alternative would be to modify the duty cycle of the pulse. In other words, modify how long a given pulse is "on" during its activation state. As an example, if the device pulses at 100 Hz, or 100 pulses per second, the pulses themselves may last 1 ms followed by 9 ms of inactivity for a duty cycle of 10%, or they could have 5 ms of activity followed by 5 ms of inactivity for a duty cycle of 50%. So, instead of modifying the signal frequency between pulses, the device could modify the duty cycle.

Another option would be to keep the signal frequency and the duty cycle at constant levels, but vary the carrier frequency. As an example, the first pulse could be at 100 Hz, the second at 95 Hz, etc. The simplest option, however, would be to emit the pulses at a low enough rate that no ambiguity is likely to occur. If the device pauses long enough after a pulse, then it will know that any pulses received by the three sensors must be the same. This option might be feasible due to the relatively slow speed of a human operator when compared to the speed of sound and the processing abilities of computer devices.

In order to perform this algorithm it is first established that the speed of sound travels at 340.3 m/s. If a tablet workspace of 2 meters is established from corner to corner, then it is possible to calculate that it would take sound 2 m/340.3 m=5.88 milliseconds to cross from one corner to the other. This corresponds to a carrier frequency of about 170 Hz. Therefore, at 170 Hz, a pulse generated at a first corner would reach a second corner at the same time as the 2nd pulse was initiated at the first corner. If the carrier frequency was halved to be 85 Hz, the pulses would be separated by 11.76 seconds, which guarantees that there would be at least a 5.88 second time gap between received signals from one pulse to received signals from the next.

As a result, if the pulses are maintained at a carrier frequency lower than 85 Hz, then the device could always identify the signals on a 2 meter or smaller workspace, even while keeping the signal frequency and carrier frequency constant.

In order to determine the position of the corner units, a different analysis must be performed. For example, if there is a single corner unit with three fixed sensor axes, then the positions are well defined and there is no need to perform any calibrations to determine relative sensor position. Likewise, if the sensors are mounted on a fixed tablet of a known size (as would be the case when using this technology with prebuilt tablets), no additional steps would be needed. However, if there are more than one moveable corner units, then the device would need to have some method to determine their relative positions.

One example method to determining the positions of the corner sensors is to implement a similar calibration procedure to the examples described above. For example, each sensor unit may have an extension arm with a button at the proximal end, as illustrated in FIG. 13. After a user sets up the sensor units, he can extend and click each of the calibration buttons with the stylus. The clicks will not only calibrate the individual sensors, since the position of the button is well-defined with respect to each sensor, but they will also provide the data needed to determine the positions of the sensors with respect to one another.

In this example, the relative sensor positions are not known, however, it is known when the stylus was pressed down with respect to the location of one of the sensor units. When one sensor records a pulse generated by the stylus as it presses another sensor's calibration button, it can compare this time to the known time of the button activation to determine a relative time difference. By calculating the distance that a sound pulse would travel in that time (taking into consideration the speed of sound at 340.3 m/s), the receiving sensor can create a conceptual sphere that represents all possible locations of the transmitting sensor with respect to the receiver. Therefore, each sensor is capable of determining the relative separation distance between itself and the other sensor(s). The data from each sensor can be combined to determine the relative position of all sensors.

Another determination that can be made is the point in time when the user is physically in contact with the tablet. As in the example of measuring the pulses between the sensors, the pulses can change shape. One example pulse shape change would be initiated by pressure measured by a pressure transducer within the stylus (or grip extension).

One example may include, at activation, the pen would emit ultrasound at a frequency of 20 kHz. When the stylus tip makes contact with the writing surface, the frequency would jump to a different frequency, such as, 21 kHz, indicating for the onscreen pointer to start tracking with stylus movement. Including an activation signal when the stylus is not in contact with the tablet permits the device to replicate the functionality of tablets, such as, those made by Wacom®.

In addition to a frequency jump at initial contact of the stylus against a surface, the device could also analyze the signal from a stylus pressure transducer, and emit a continuous change to the emitted frequency based on the amount of pressure being applied. Different applications could use this additional signal information (i.e., pressure of stylus) as needed. For example, certain graphics packages and related applications could draw a thicker line with increased pressure by the user.

An alternative example of the acoustic technology is to use a passive stylus that does not include self-contained circuitry, according to an example embodiment of the present invention. One example embodiment of a passive stylus design is to provide a stylus made of an echo-genic (i.e., sound-echoing) material. The corner sensors would include transmitters or transceivers that could be used to determine the stylus's position. Such a configuration would be similar to the sonar concept that operates through the air medium. In operation, the movement of the echo-genic stylus would provide disturbances in the air which could be detected by the transceivers at the corner sensors.

Another example design of a passive stylus would include a passive stylus that acts passively and actively. Such a stylus would not have any complex circuitry but would still have an active component that would emit an ultrasonic signal. For example, in operation, the user would bear down on a ball-point stylus, and the rotation of the ball or the friction coefficient of the material of the tip would activate a transducer which would power the ultrasound generation components.

In this transducer initiated example, the device may only be powered on during stylus motion, the stylus design would be more sophisticated due to exact specifications of the stylus tip (i.e., certain ball-point tip and transducer assembly), and the stylus components would not be suitable for incorporation into a simple interchangeable stylus grip.

Although the general description of the simplified acoustic technology makes use of at least two of the above-noted examples (e.g. tablet size and surface customization through use of independent movable sensors and calibration through use of buttons on extendable arms at the sensors), the acoustic technology could be used in other configurations not yet mentioned. For example, this simplified acoustic technology could be used on a traditional pen tablet device with a tablet of a fixed size with fixed sensors. On the other hand, the acoustic technology could also be used as part of a device that incorporates the alternative stylus design (i.e., the ergonomic grip device sensor). For that case, all of the electronics could be built into the grip device that would be associated with whatever stylus the user desires to use.

Similar to the above-noted example describing the independently positional sensor units, some designs of these acoustic pen tablet devices could be configured to operate in a "virtual touch" or three-dimensional capacity beyond the typical two-dimensional writing surface. Such motion detection devices would have the ability to create three-dimensional input signals for an electronic device without the need to physically touch any tablet or keyboard.

The above-noted pen tablet devices may be incorporated into specialized software applications that operate with user text input devices. For example, auto-complete features including spelling correction and other helpful character recognition and word building applications, which are built into the texting capabilities of mobile phones (e.g., iPhone®). As an example, the device might recommend the word "Sunday" after the user has typed "Sund", etc. In addition, the device considers that the user might have mis-typed, perhaps suggesting "Sunday" after the user typed "Dund", etc.

For pen tablet devices, however, an additional type of auto-complete and character recognition software would be useful. For example, a sloppily hand-drawn letter "T" might still be recognized as a "T" based on this software. In another example, users inputting more complicated lettering schemes could also receive different choices that may satisfy his or her intended message. For example, if a user is inputting a Chinese character, the device would be able to limit the number of possibilities. However, because of the abundance of Chinese characters, the device might not be able to immediately identify the desired character in a first attempt. In this example, the software could offer the choices with the highest probability and allow the user to select which one is correct. For those cases in which the probabilities of potential character choices are below a given threshold (i.e. the software has a lesser likelihood that it knows what character was intended), it can simply display the entered strokes to the user and allow him to add to or replace his or her input. The software application can assist with textual input speed and accuracy.

Figure 16:
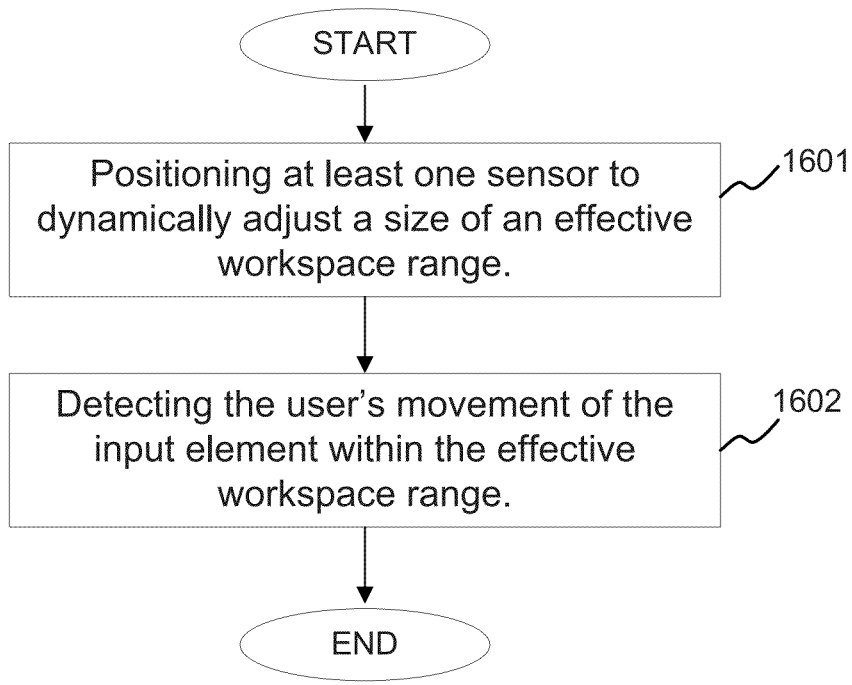
FIG. 16 illustrates another example flow diagram according to an example embodiment of the present invention.

One example method of the present invention may include detecting user initiated movement by an input element handled by a user, according to an example embodiment of the present invention. FIG. 16 illustrates this example method. Referring to FIG. 16, the method may include positioning at least one sensor to dynamically adjust a size of an effective workspace range, at operation 1601. The method may also include detecting the user's movement of the input element within the effective workspace range, at operation 1602. This provides the user with the ability to customize the size of his or her preferred workspace.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. An apparatus, comprising:
    a calibration input unit configured to perform a calibration procedure that is initiated by a physical movement performed by a user; and
    at least one sensor capable of detecting the user's movement of an input element;
    wherein the calibration input unit comprises a button that is disposed on a rigid arm and is moveable by movement of the rigid arm from a stored position within a housing of the sensor to an outward position at a known position relative to the sensor, wherein the button is coupled to the at least one sensor and is selectable by the user using the input element;
    wherein selection of the button by the input element establishes a position of the input element at the button relative to the sensor; and
    wherein the calibration input unit is configured to perform the calibration procedure by comparing a known position of the button relative to the sensor with a sensed position of the button as detected by the input element being placed on the button.

2. The apparatus of claim 1, wherein the input element is a passive pen-shaped writing utensil that does not contain any electronic components.

3. The apparatus of claim 2, wherein the button is selected by a pressing motion performed via the input element, and wherein the calibration input unit measures the position of the input element.

4. The apparatus of claim 3, wherein the calibration input unit determines whether the calculated position of the input element matches a known position of the calibration unit button, and, if so, then the calibration procedure is complete, and, if not, the calibration input unit adjusts a calculation algorithm used to determine the position of the calibration button.

5. The apparatus of claim 2, wherein the apparatus further comprises a calibration arm that extends from the sensor, and which is capable of being extracted from the sensor via a folding movement, wherein the calibration arm comprises the button.

6. The apparatus of claim 1, wherein the sensor is adapted to sense the position of the input element when the input element is on the button.

7. The apparatus of claim 1, wherein the input element comprises a transmitter that emits ultrasound burst signals which are received at the sensor.

8. The apparatus of claim 7, wherein the at least one sensor detects the arrival time of the burst and compares it to the arrival time at another sensor to determine the position of the input element.

9. The apparatus of claim 8, wherein the position of the input element is performed via a triangulation algorithm.

10. The apparatus of claim 8, wherein the at least one calibration unit is further configured to determine the position of the at least one sensor based on the position of said another sensor.

11. A method, comprising:
    performing a calibration procedure that is initiated by a physical movement performed by a user; and
    positioning at least one sensor that detects the user's movement of an input element;
    wherein performing the calibration procedure comprises extracting a rigid arm from a housing of the at least one sensor to an outward known position relative to the at least one sensor;
    selecting a button that is disposed on the rigid arm and that is coupled to the at least one sensor using the input element; and
    wherein selection of the button by the input element establishes a position of the input element at the button relative to the sensor.

12. The method of claim 11, wherein the input element is a passive pen-shaped writing utensil that does not contain any electronic components.

13. The method of claim 12, wherein the button is selected by a pressing motion performed via the input element, and wherein the calibration input unit measures the position of the input element.

14. The method of claim 13, further comprising determining whether the calculated position of the input element matches a known position of the calibration unit button via the calibration input unit, and, if so, then the calibration procedure is complete, and, if not, the calibration input unit further comprises adjusting a calculation algorithm used to determine the position of the calibration button.

15. The method of claim 12, further comprising extending a calibration arm from the sensor, which is capable of being extracted from the sensor via a folding movement, and wherein the calibration arm comprises the button.

16. The method of claim 11, wherein the sensor is adapted to sense the position of the input element when the input element is on the button.

17. The method of claim 11, further comprising emitting ultrasound burst signals, via the input element, which are received at the sensor.

18. The method of claim 17, further comprising detecting the arrival time of the burst and comparing it to the arrival time measured at another sensor to determine the position of the input element.

19. The method of claim 18, wherein the position of the input element is performed via a triangulation algorithm.

20. The method of claim 18, further comprising determining the position of the at least one sensor based on the position of said another sensor.

* * * * *